(12) United States Patent
Butterbrodt et al.

(10) Patent No.: US 7,784,374 B1
(45) Date of Patent: Aug. 31, 2010

(54) SEPARABLE CARRIER BLOCK

(75) Inventors: Karl J. Butterbrodt, Hudson, WI (US); Raymond E. Zindrick, Hudson, WI (US)

(73) Assignee: Konrad Corporation, Hudson, WI (US)

( * ) Notice: Subject to any disclaimer, the term of this patent is extended or adjusted under 35 U.S.C. 154(b) by 283 days.

(21) Appl. No.: 11/591,216

(22) Filed: Nov. 1, 2006

Related U.S. Application Data

(60) Provisional application No. 60/741,332, filed on Dec. 1, 2005.

(51) Int. Cl.
*F16H 1/24* (2006.01)
*F16H 55/02* (2006.01)
(52) U.S. Cl. .................. 74/424.78; 74/424.71
(58) Field of Classification Search .............. 74/424.71, 74/424.78, 424.79, 499, 89.23, 89.32, 89.33, 74/89.37; 411/432, 433, 539, 540
See application file for complete search history.

(56) References Cited

U.S. PATENT DOCUMENTS

| | | | | |
|---|---|---|---|---|
| 1,415,840 A | * | 5/1922 | Klausmeyer | 74/424.79 |
| 3,427,546 A | * | 2/1969 | Peart et al. | 338/180 |
| 3,521,503 A | * | 7/1970 | Jorg | 74/606 R |
| 3,799,292 A | * | 3/1974 | Katz | 187/267 |
| 4,219,378 A | * | 8/1980 | Marschke | 156/502 |
| 6,293,723 B1 | * | 9/2001 | Kiefer | 403/21 |

* cited by examiner

*Primary Examiner*—Richard W Ridley
*Assistant Examiner*—Daniel Yabut
(74) *Attorney, Agent, or Firm*—Anthony G. Eggink; Katrina M. Eggink

(57) ABSTRACT

A separable carrier block assembly constructed for cooperation with a threaded lead screw of a machine. The carrier block assembly is constructed of mating block body halves comprising a first body half and a second body half. The mating body halves are separable at generally midway the depth of the carrier block body. The inside faces of the first and second block halves have cooperating and mating lands and grooves which are constructed and arranged to form a unitary nested carrier block body. A generally threaded semicircular bore is formed into the inside faces of the first and second block body halves and extends generally midway of the depth of the nested carrier block body and extend along the length of the block body. The threaded bore matches the threads of a threaded lead screw. The threads of the threaded bore are preferably beveled. A second bore extends through the depth or thickness of the carrier block body and is located normal to and spaced from the threaded bore. The second bore is used to support a weight bearing shaft of the machine. A plurality of second bores extend through the carrier block body and through which a plurality of fasteners such as shoulder bolts and propel nuts extend to secure the first body half to said second body half. The second bores are preferably countersunk. The separable carrier block assembly allows for easy maintenance and quick replacement of worn lead screw carrier blocks.

15 Claims, 7 Drawing Sheets

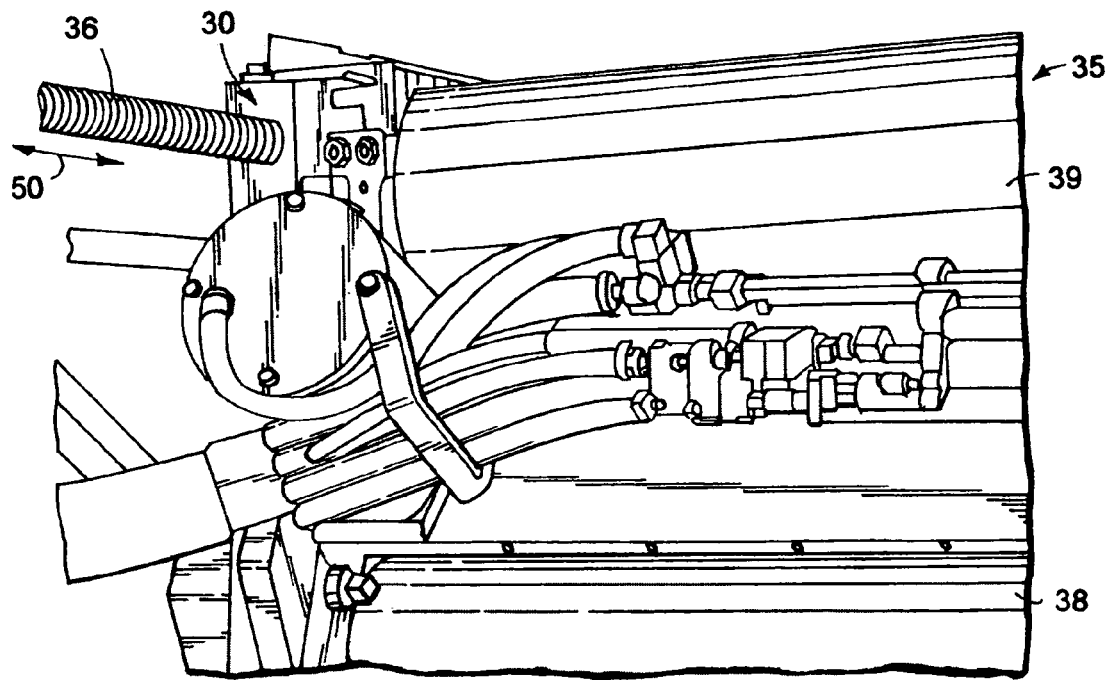
FIG. 1
PRIOR ART
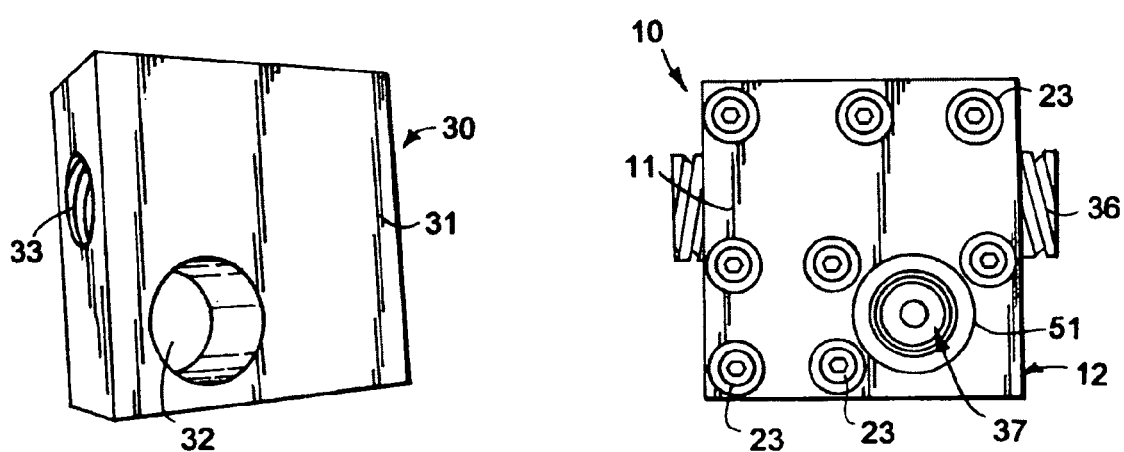
FIG. 2
PRIOR ART
FIG. 3

SEPARABLE CARRIER BLOCK

This application claims the benefit of U.S. Provisional Patent Application Ser. No. 60/741,332, having the filing date of Dec. 1, 2005.

BACKGROUND OF THE INVENTION

The present invention relates generally to a lead screw carrier block and particularly to a separable carrier block structure to allow a worn lead screw carrier block to be easily and rapidly maintained and changed.

Carrier blocks are utilized, for example, in large machinery to support and move machine components in a continuous manufacturing process. The separable carrier block of the invention comprises mating, separable block body halves which permit the separation of the two block halves from a lead screw, and by reversing the process of the installation of the new carrier block halves.

Lead screw carrier blocks have been used for many years in machines, such as in a Marquip Model I splicing head, for example. A prior art carrier block is constructed as a unitary structure to carry and drive the splicing head structure throughout the machines operation by means of a mechanical system which converts rotational motion of the lead screw into the linear movement of the carrier block and the attached machine splicing structure.

Although prior art lead screw carrier block configurations are suitable for such purposes, they are difficult to service and to allow a worn carrier block to be maintained and rapidly changed. The main problem with conventional lead screw carrier blocks is that the design and configuration of the block makes change outs very time consuming due to the complexity of the mechanical components that need to be removed and then reinstalled. Another problem is that the maintenance checks as prescribed in OEM procedures are based on preventive schedules that are not necessarily accurate in gauging the true functionality of the carrier block. Another problem is the potential collateral damage caused to other machine components and loss of machine reliability when a carrier block has not been correctly serviced.

The separable carrier block of the present invention substantially departs from the conventional concepts and designs of the prior art and provides an assembly developed for the purpose of allowing a worn lead screw carrier block to be rapidly changed by unbolting two block body halves, separating them from the lead screw, and then reversing the process to install the new carrier block body halves.

In view of the disadvantages inherent in the known types of lead screw carrier blocks present in the prior art, the present invention provides a novel boltable split or separable carrier block construction which can be utilized for allowing a worn lead screw carrier block to be easily serviced and rapidly changed.

SUMMARY OF THE INVENTION

The present invention relates to a separable carrier block assembly. The carrier block assembly comprises mating right and a left half carrier block bodies which are joined to form a unitary block structure, secured by specified fasteners and tightened to a specified torque setting.

The separable carrier block assembly of the invention is constructed for cooperation with a threaded lead screw of a machine. The carrier block assembly comprises a carrier block body having a length, a height and a depth, and is constructed of mating block body halves comprising a first body half and a second body half. The mating body halves are separable and located generally midway the depth of the carrier block body, and each first and second block body half has an inside face. The inside faces of the first and second block halves have cooperating and mating lands and grooves which are constructed and arranged to form a unitary nested carrier block body when mated. A generally threaded semi-circular bore is formed into the inside faces of the first and second block body halves and extends generally midway of the depth of the nested carrier block body and extend along the length of the block body. The threaded bore matches the threads of a threaded lead screw. The threads of the threaded bore are preferably beveled.

A second bore extends through the depth or thickness of the carrier block body and is located normal to and spaced from the threaded bore. The second bore is used to support a weight bearing shaft of the machine. A plurality of second bores extend through the carrier block body and through which a plurality of fasteners such as shoulder bolts and propel nuts extend to secure the first body half to said second body half. The second bores are preferably countersunk.

The carrier block body is preferably composed of a nylon composition, but may be constructed of aluminum, bronze and metal, for example. The block half body of the carrier block assembly may also be provided with a wear plate. The carrier block body assembly may be provided as a right side carrier block assembly and a left side carrier block assembly and thus provided in sets. Machines typically utilize four carrier blocks, or two such carrier block sets, one set being used on each side of the machine.

In summary, the carrier block assembly comprises a separable, mating two part body structure defining separate body halves having mating lands and grooves and formed of a generally rectangular solid structure having a length, a height and a thickness and being separable at the carrier block thickness. The carrier block has a threaded bore along its length and a non-threaded bore normal to and spaced from the threaded bore through its thickness. The carrier block has a plurality of apertures through said body thickness, and a plurality of fasteners for extension through said plurality of apertures to thereby secure the separate body halves to form the carrier block.

These and other benefits of this invention will become clear from the following description by reference to the drawings.

BRIEF DESCRIPTION OF THE DRAWINGS

FIG. 1 is a perspective view showing a splicing head assembly of a machine using a prior art carrier block on the lead screw;

FIG. 2 is a perspective view of the prior art lead screw carrier block of FIG. 1;

FIG. 3 is a frontal view showing the separable carrier block of the present invention in use with a lead screw;

DESCRIPTION OF THE PREFERRED EMBODIMENTS

Figure 4:
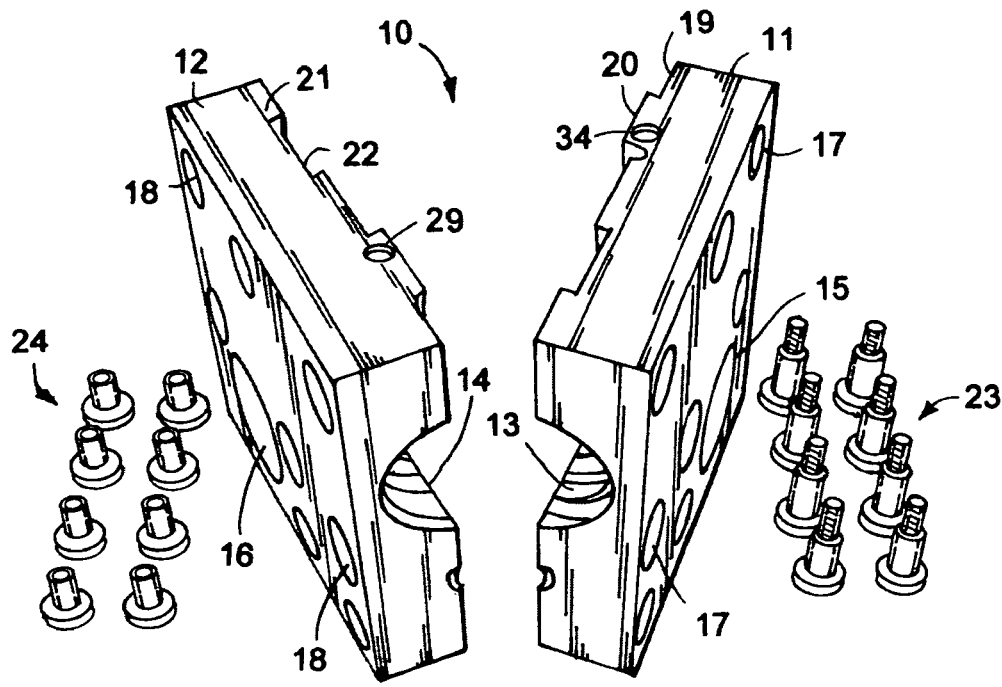
FIG. 4 is a perspective view showing the elements for a right hand separable carrier block prior to assembly.

Referring to the drawings, in which similar reference characters denote similar elements throughout the several views, the attached drawing figures illustrate a separable and boltable split carrier block assembly, which comprises a right and a left half block body which are joined to form a unitary block structure, secured by specially designed fasteners and then tightened to a specific torque setting.

The separable carrier block of the invention is shown and described in the following drawing figures, wherein FIGS. 1 and 2 show the prior art and the use of lead screw carrier blocks, FIGS. 3-8 show the separable carrier block assembly of the present invention, FIGS. 9-12 show the process of manufacture of the carrier block of the invention and FIGS. 13-17 show the replacement of a prior art carrier block by the separable carrier block of the invention. The operation of a splicing machine having a splicer head assembly and describing an exemplary use of a lead screw carrier block is also set forth below.

FIGS. 1 and 2 show a prior art or original equipment manufacturer (OEM) carrier block 30 utilized in a splicer head assembly 35 of a splicer machine and which provides a continuous web from a supply roll in a manufacturing process, i.e., providing supply rolls of paper to a converting machine. The splicer head assembly 35 is shown to have the unitary carrier block 30 positioned around lead screw 36. The turning of lead screw 36 causes the carrier block 30 and thus the nip roll 39 to be moved with respect to the moving web as indicated by arrow 50. The carrier block 30 is also shown mounted to a movable frame to which the roll 38, for example, is attached and the carrier block 30 is engaged by the lead screw 36. As shown in FIG. 2, the carrier block 30 has a generally unitary rectangular body 31 having a threaded bore 33 in and through which the lead screw turns. A bore 32 which is normal or perpendicular to threaded bore 33 is utilized to hold a bearing/shaft arrangement, i.e., bearing 51, shaft 37, to support the movable splicer head structure 35 when the lead screw 36 is rotated.

FIG. 3 shows the separable carrier block assembly 10 of the present invention and which is an improved replacement for the OEM carrier block 30. The carrier block 10 is a separable load bearing and rotary transfer structure having separable block body halves 11 and 12. Shoulder bolts 23 are shown on the outer face of body half 11 and are part of a fastening system which hold the two block halves 11 and 12 together as a unitary structure. The carrier block 10 is shown having a lead screw 36 extending therethrough. The end of fixed shaft 37 with bushing 51 is shown mounted through the carrier block 10. In operation, the turning of lead screw 36 causes the carrier block 10 to move linearly and thus to move bearing/shaft 37 and the machine elements mounted or connected to the shaft 37.

Figure 5:
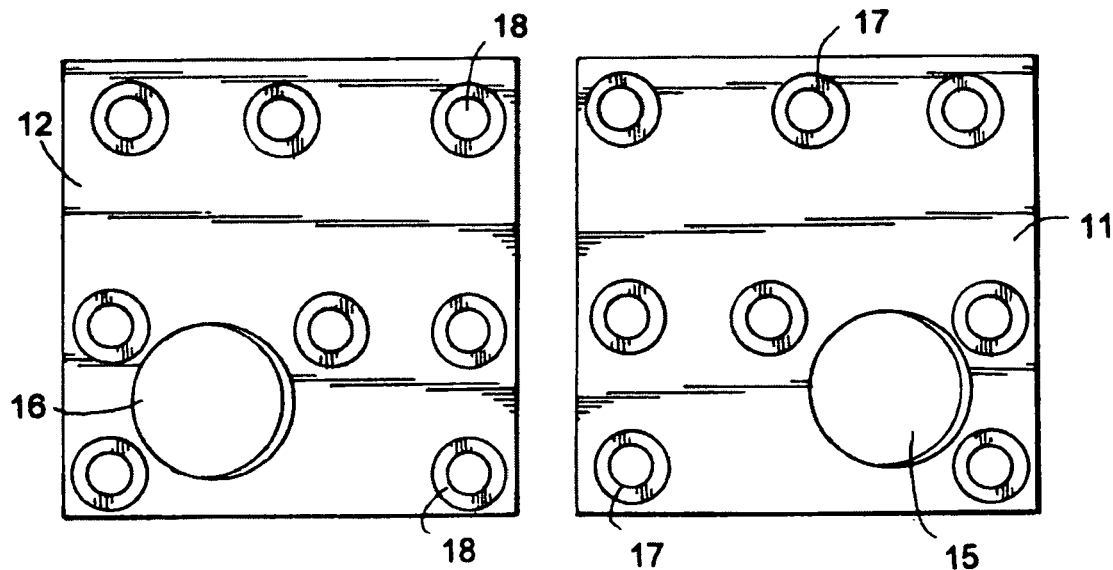
FIG. 5 is a perspective view showing the exterior faces of the block halves of FIG. 4.
Figure 6:
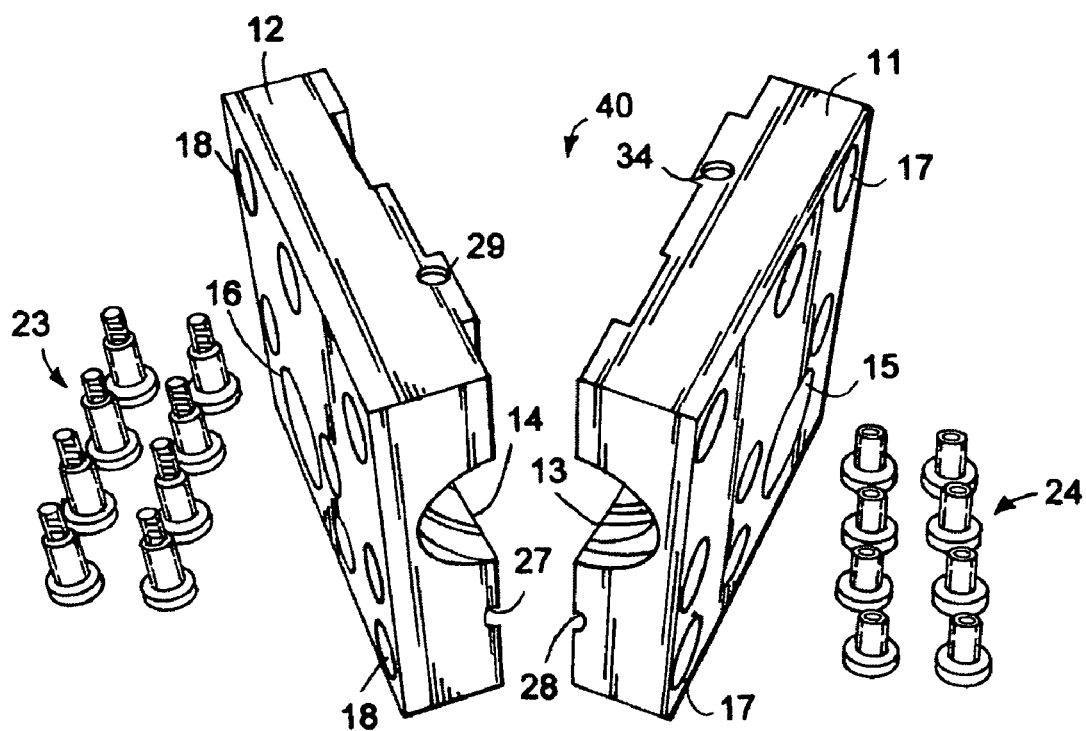
FIG. 6 is a perspective view showing the elements for the left hand carrier block prior to assembly.

Referring to FIGS. 4-6, the separable carrier block assembly 10 is shown comprised of a right block body half 11 and a left block body half 12. The right block half 11 is a generally rectangular structure formed of a nylon based material, for example, as further discussed below. The block body is shown to have a length, a height and a depth. The inside face of body 11 has vertically machined lands 20 and grooves 19 extending from the top to the bottom to form a mating inside face. A plurality of holes, i.e., eight relatively small apertures 17 and one larger hole or bore 15 are provided through block 11. The apertures 17 are shown in three rows and are differently disposed as those shown in FIG. 3. The inside face of block 11 also has a semi-circular threaded hole 13 extending across its horizontal length (l) and positioned above the center-line of the block body 11. The preferred thread is known as a dual lead in ACME. In line with and positioned below the horizontal centerline is another half threaded hole 28 placed at the body 11 end. Finally, there are two partial threaded holes 29 and 34 that are vertically placed from the top face. Threaded hole 29 is in the top of block half 12 and threaded hole 34 is in block half 11. The threaded holes 29 and 34 align when the block halves 11 and 12 are mated and receive screws that hold a structure for engaging a limit switch. From the opposite or outside face, of the carrier block structure the one large hole or bore 15 can be seen closest to the bottom and right vertical edge and the eight through holes or apertures 17 can be seen as counter bored or countersunk 25 to a specific depth in the right half block 11. The countersunk apertures are provided for the propel nuts 24 and shoulder bolts 23.

The left half block 12 is generally structured as a mirror image of the right hand block 11, in effect the above broad description is identical except for the lands 21 and grooves 22. The lands 21 and grooves 22 for the left hand block 12 are complementary, meaning that a land 20 from the right block 11 will fit into a groove 22 on the left block 12. Conversely, a groove 19 on the right block 11 will mate with a land 21 from the left half block 12. In this manner, all complementary lands and grooves align and the block halves 11 and 12 will tightly interlock with each other when mated to form the separable carrier block.

FIG. 4 shows the separable carrier block 10 having the right block body half 11 separated from the left half body half 12 and showing the shoulder bolts 23 and propel nuts 24 which are used to fasten the carrier structure 10. Right block half 11 is shown to have a length "1", a height "h", and depth "½d". The semi-circular threaded bore 13 is shown as are bore 15 and apertures 17. Grooves 19 and lands 20 are shown. Left block half 12 is shown to have semi-circular threaded bore 14, bore 16 and apertures 18. Lands 21 and grooves 22 are shown disposed opposite the cooperating grooves 19 and lands 20 of the right block body half 11. Semi-circular threaded bore 27 is shown disposed at the end of block body 12 to match with semi-circular bore 28 of block 11.

Figure 7:
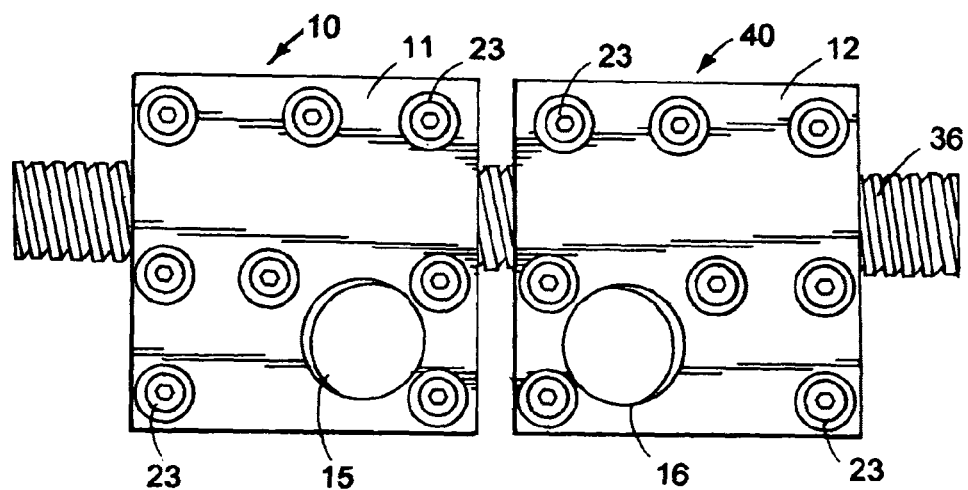
FIG. 7 is a perspective view showing both left and right separable carrier blocks installed on a lead screw.
Figure 8:
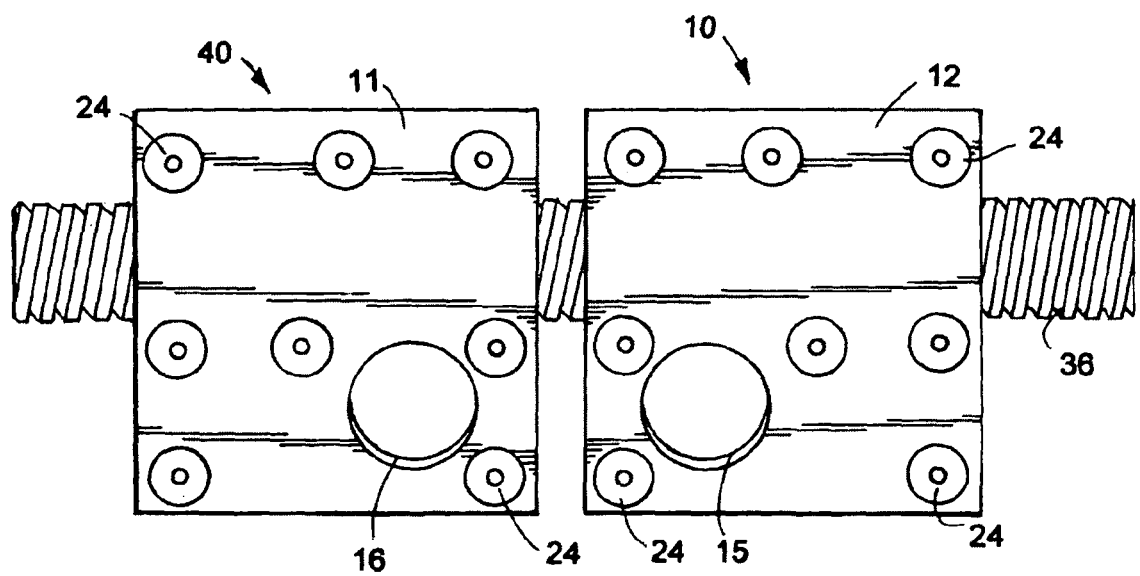
FIG. 8 is a perspective view showing the opposite side of the carrier blocks of FIG. 7.

FIG. 5 shows the front faces of right block body half 11 and left block body half 12. The body halves 11 and 12 may be utilized to form either a right side carrier block assembly 10 or a left side carrier block assembly 40 as shown in FIG. 6. As shown, the shoulder bolts 23 and propel nuts 24 are disposed and used on opposite sides. Particularly as shown in FIGS. 7 and 8, respectively, the right side carrier block assembly 10 is shown mounted adjacent left side carrier block assembly 40 on lead screw 36. In FIG. 7 body halves 11 and 12 are shown respectively, whereas in FIG. 8 body half 12 (assembly 10) and body half 11 (assembly 40) are shown in the outwardly facing position. Shoulder bolts 23 are shown disposed outwardly in FIG. 7, whereas the propel nuts 24 are shown disposed outwardly in FIG. 8. The shoulder bolts 23, therefore, are disposed on the outside face of the separable carrier blocks 10 and 40 for access to tighten and remove the block structures.

Process of Carrier Block Manufacture

Figure 9:
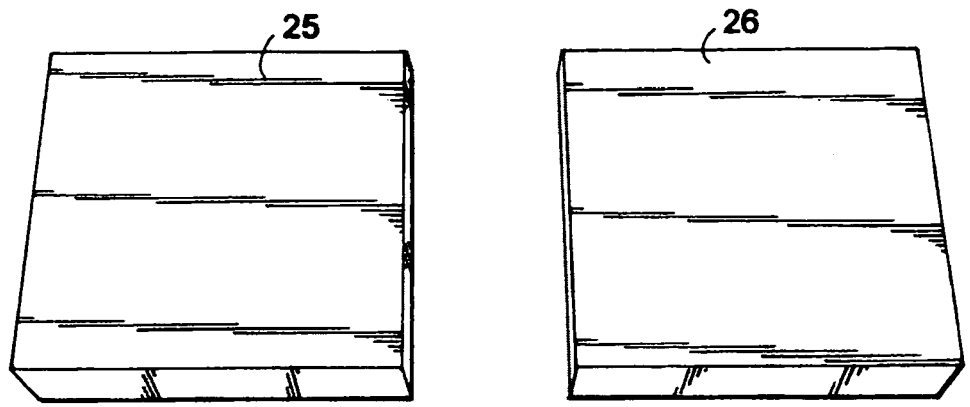
FIG. 9 is a perspective view of two pieces of raw material used to machine carrier block body halves.
Figure 10:
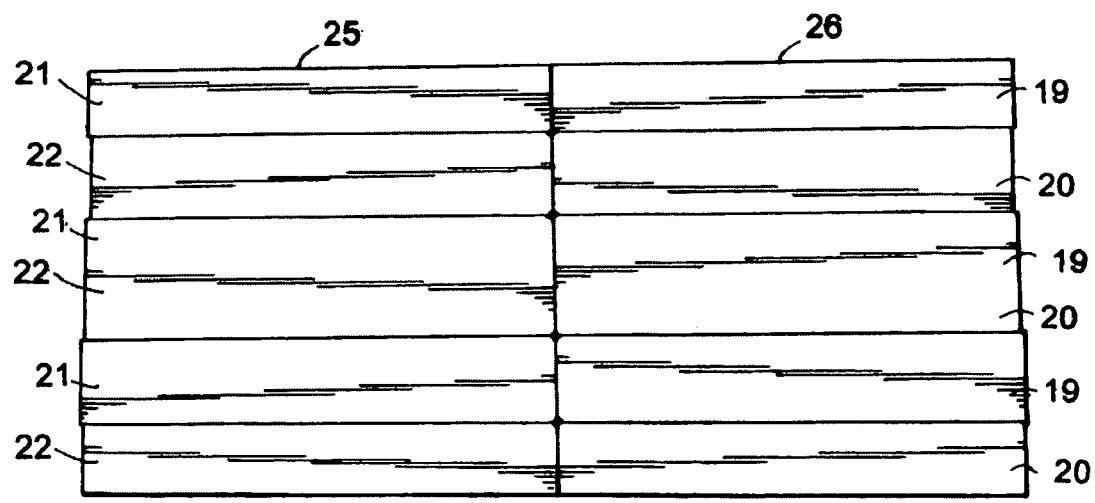
FIG. 10 is a perspective view that illustrates the lands and grooves that are machined into the right hand block half and left hand block half.
Figure 11:
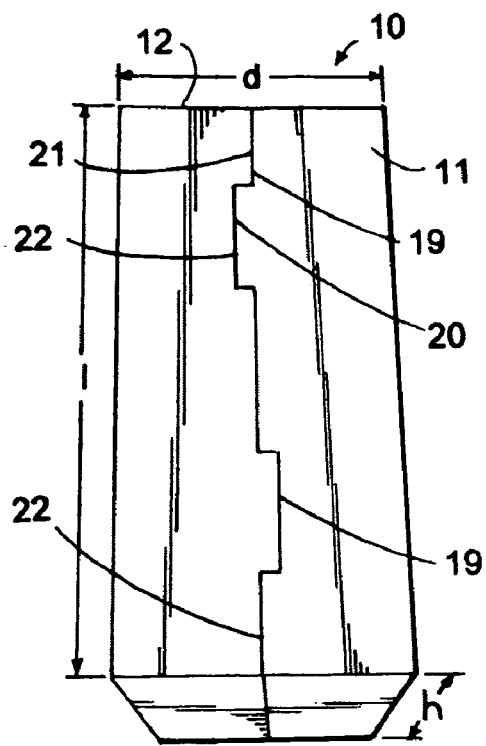
FIG. 11 shows the two block halves mated prior to the machining processes.
Figure 12:
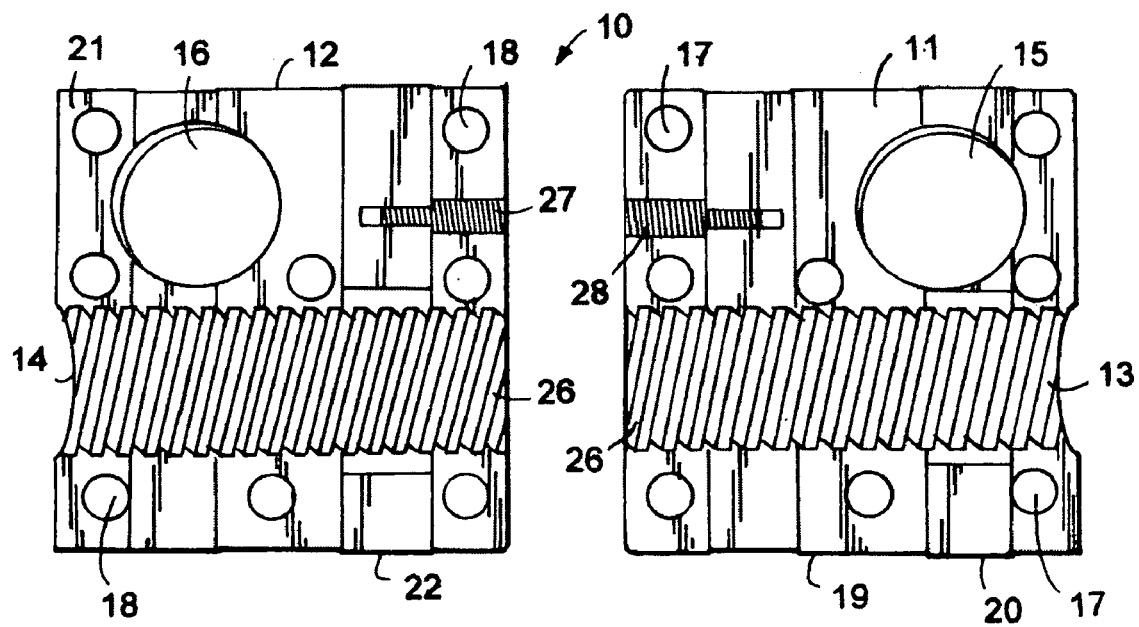
FIG. 12 is the present invention showing the two block halves split apart after all machining has been completed.

FIG. 9 shows two rectangular pieces 25 and 26 of raw material which form the basis of the two block body halves 11 and 12 discussed above. Both block halves 25 and 26 are preferably made from a nylon based material, known under the trademark Nylatron GSM, for example, which has the properties of strength, ease of manufacturing and wear characteristics that make it ideal for the application of forming a carrier block. As shown in FIG. 9, both blocks 25 and 26 have been cut to a length of approximately 3.81 inches, a height of approximately 4.00 inches and approximately 1.00 inch in depth. The blocks 25 and 26 are then machined as shown in FIG. 10 with vertical lands and grooves 21 and 22 and 19 and 20, respectively. FIG. 11 is a top view showing the interlocking structure of the right and left block halves 11 and 12 of carrier block 10. Two mirror image block are manufactured to form the structure of FIG. 11, wherein block halves 11 and 12 are identified. The top edges of blocks 11 and 12 are shown aligned, both halves are tightly compressed and then secured. The unified blocks are cross drilled through with eight 5/16 inch holes 17 and 18 as shown in FIG. 12, which also shows the inside faces of the blocks fully machined. Each of the sixteen holes or apertures shown are counter bored out to ½ inch and 0.350 inches in depth as shown in the outside face view of FIG. 5. The two blocks are then bolted together and the fasteners are tightened. Once bolted together, an approximately 1.375 inch diameter hole is drilled through and centered approximately 1.188 inches from the front face and approximately 1.000 inch from the bottom face. The longitudinal threaded holes, as shown in FIG. 4 and FIG. 6 are first drilled through at approximately 1.000 inch diameter, centered, and approximately 2.500 inches up from the bottom face. On the top face and as further shown in FIGS. 4 and 6, two holes approximately ¼×20 by ½ inch and 1½ inches apart are drilled and tapped. The blocks can now be separated and beveled cuts are made fully across the edges of each ACME thread. The blocks are then reassembled and marked as to either a L or a R as shown in FIGS. 7 and 8.

To those skilled in the art, changes and variations of the carrier blocks and the block halves include those that may be constructed of metals, metal alloys, different metals such as bronze or aluminum, or polymeric materials other than the nylons described herein. The carrier block dimensions can vary in width, length or height, and depth and the mating slots can be changed to be v-grooved or circular shapes along with the number of slots and their relationship to each other. The type of fasteners used and the number of fasteners along with their placement on the block and the width and depth of the holes used to fasten the blocks together can also vary. The manner of fastening the two blocks together can be altered by adding metal strips or a framework for added strength. The addition of rollers or wear strips to the bottom of the block to aid in traversing the supporting the head is possible. The inclusion of grease seals on the lead screw thread ends may further aid in the wear rate of the block threads.

The interconnection of the main components can allow for the combined components to be either designated as a "Right Block" or a "Left Block". The following describes how a "Right Block" is made. The Right Block determination begins during the early construction phase when the two half blocks are first mated and the eight holes are drilled and counter bored. The two halves are then fastened by inserting Propel-Nuts into their proper holes on the LHB as shown in FIGS. 7 and 8. The eight shoulder bolts with washers are inserted into their proper holes on the RHB as shown in FIG. 7, then all bolts are tightened to a specified torque of approximately 60 inch pounds. The tightening draws the self locking propel-nuts down until they are fully inserted and locked in. The combined block will then enter the final machining phase when all drilled and tapped holes are completed described above and seen in FIGS. 7 and 8. These figures also show how a right block has the propel-nuts and shoulder bolts arranged, the process of finishing the block is the same as the left block. At the end of the construction phase, the blocks are reassembled and all bolts are lightly torqued for storage.

Carrier Block Installation Procedure

Figure 13:
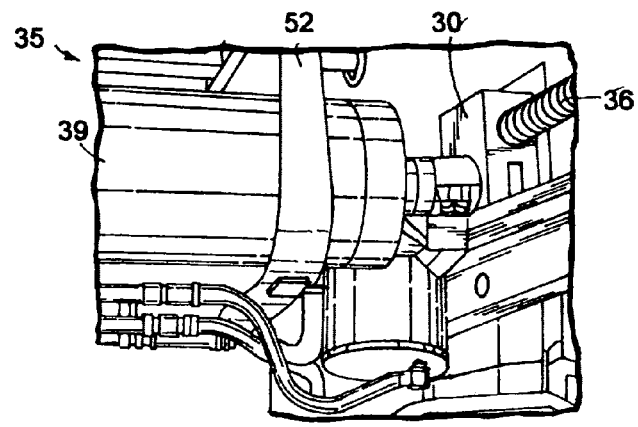
FIG. 13 is a perspective view showing a splicer head assembly having a prior art carrier block.
Figure 14:
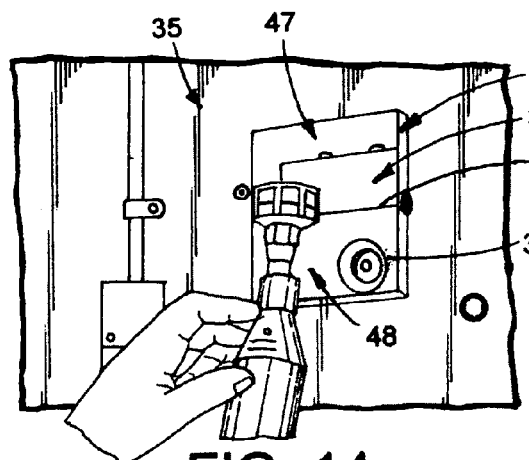
FIG. 14 is a perspective view showing the access plate removed from the splicer head assembly to access the prior art carrier block for removal.
Figure 15:
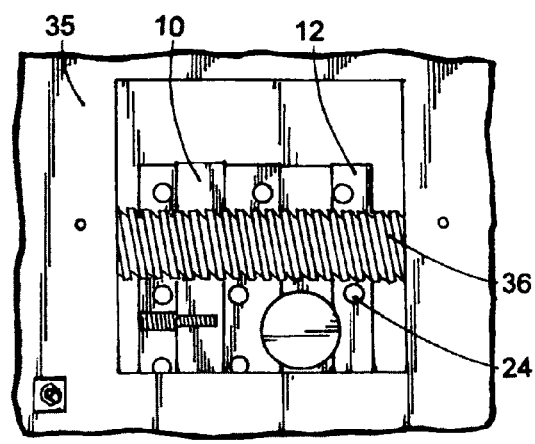
FIG. 15 is a perspective view showing the first half of the separable carrier block of the invention positioned with respect to the lead screw.
Figure 16:
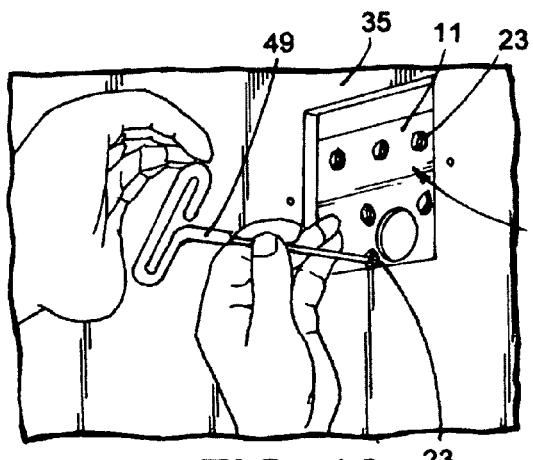
FIG. 16 is a perspective view showing the second half of the carrier block being fastened to the first carrier block body half.
Figure 17:
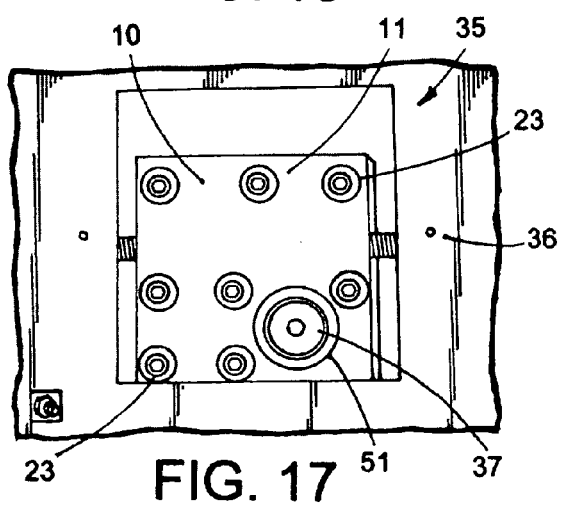
FIG. 17 is a perspective view showing the separable carrier block of the invention installed in the splicer head assembly.

The following description relates to the carrier block installation on a machine. Referring to FIGS. 13-17, the separable carrier block 10 of the present invention is shown being replaced in a splicer head assembly 35. In FIG. 13, the splicer head assembly 35 is shown having a prior art carrier block 30 installed about the lead screw 36. The splicer head assembly 35 is shown to have an opening 47 which is normally covered by an access plate. In FIG. 14, the access plate has been removed and a cutting tool 48 is shown being utilized to remove the prior art unitary carrier block 30 from around the lead screw. As shown, cut line 53 is being made to remove the block 30. After removal of the old block and supporting the load bearing shaft via strap 52, the first body half 12 of the separable carrier block 10 of the invention is shown positioned with respect to the lead screw 36 in FIG. 15. The propel nuts 24 are shown positioned in the apertures of the block body half 12. In FIG. 16 the shoulder bolts 23 of the fastener system are shown being tightened by means of alien wrench 49 to secure the second body half 11 of the carrier block 10 to the first body half 12 to thereby secure the separable carrier block 10 about the lead screw 36. In FIG. 17, the load bearing shaft 37 is shown installed in the bore of the carrier block 10, thereby permitting the splicer head assembly 35 to be utilized. Subsequent repairs and carrier block replacements are now easily made in that only fasteners need to be removed once the load is supported.

Using the OEM procedure, the existing carrier blocks 10 are accessed and removed. The replacement blocks are unbolted and separated and then installed around the lead screw as shown in FIGS. 7 and 8. When the blocks are mated and aligned, they are refastened as shown in FIGS. 7 and 8. The shoulder bolts 23 are then tightened to the specified torque of approximately 60 inch pounds. The block is now ready to have the OEM bushing, the top tab and the preparation bar installed as per OEM procedure. The following is a description of the operation of a splicer head assembly which is provided to understand the importance and use of the carrier block of the present invention.

Operation of Splicer Head Assembly

The following is a description of a splicing head assembly in which the carrier block of the present assembly is used.

Although apparent to those skilled in the art, the carrier block may be used for other purposes to move a load via the transfer of rotary motion. The description in the context of use in a splicing head assembly is illustrative. The lead screw carrier block is used in the machine to support a load and to transfer rotary power into linear motion. A prior art "carrier block" is drilled and tapped through the longitudinal axis to accept an ACME type lead screw which rotates and propels the carrier block. The block has another hole drilled through in the cross axis that has a bushing installed which together is used to support and linearly move the load. The bushing accepts the stub end of a fixed shaft which has an opposite end that mates to another bushing/block. The fixed shaft supports a rotating machined roll with a fixed bearing on each end and is known as the splicing nip roll. A sub-frame assembly is also fitted over and then bolted tightly to each end of the shaft between the blocks and the nip roll bearings. The complete frame assembly consists of the two sub frames with a cross frame brace bolted between them, to which other components are attached. The complete assembly is known as the splicing head assembly and is supported on each end by the carrier block and a cam roller. Each carrier block and cam roller rides on a track bolted to the splicer main side frames with the head assembly mounted between and driven along each of the tracks by the lead screw drive. The complete head drive system is comprised of two lead screws, the carrier blocks/bushings, a 1 HP AC motor, drive and driven sprockets, drive and driven chains, thrust bearings, bearing blocks and assorted fasteners. A 460 VAC 3 phase motor is powered by a reversing starter, which is controlled by various logic systems. There are also two switches per head that limit the end to end travel, referred to as "head in" and "head out" positions. Each head drive assembly is paralleled by a standard procedure, which ensures the carrier blocks on each head are exactly timed to each other.

There are two heads on each splicer, which are then parallel to each other by means of the mechanical settings achieved during the individual head paralleling procedure. The parallel achieved between the two heads is very important during the machine's primary purpose, which is termed the "splicing sequence". The splicing occurs between the two opposing nip rolls when the carrier blocks are briefly powered against their respective inner stop blocks. The steel nip rolls are crowned, so they will make contact first in the center and then bend or deflect against each other as the heads continue to bottom. The nip rolls are designed to deflect or bend against each other so they make full contact when the carrier blocks are against their bearing blocks. The narrow yet high contact force between the rolls is utilized to nip and seal the new web to the old web. The new web is initially prepared by applying a 2 inch strip of double sided tape, for example, across the web, indexed and then run to a "head in position". The prepared head stops a preset distance away from the running nip, which enables the "splice ready" circuits. When the splice is initiated, the old web is stopped, the nips are powered together to form the initial seal, then the webs are released and pulled through the nip rolls to complete the seal. The timing circuits will back the unused head away from its full in position while the new head remains fully in. Now that the splicing sequence is completed, the unused head can be manually powered out, the paper reloaded and the cycle repeated. Throughout the sequences of splicing and preparing the new splice, the head is cycled back and forth along the support tracks. The carrier blocks are mildly stressed throughout this travel until the head approaches the area where the splice occurs, known as the head in position. In that position, the cam rollers are allowed to drop below the level of the horizontal tracks and follow an angled bar down until they drop into and between two vertical bars that are used for containment. This transition of the cam followers then places the full weight of the head on the carrier blocks until the head is stopped close to the full head in position. At time of splice, the head is powered in until the blocks bottom against the stops while the other head is also powered in. The stress put upon the carrier blocks at this point are at their maximum and causes the carrier block structure to give under the torquing pressure of the lead screw. The constant cycling of the head eventually causes the carrier block to lose the screw to block tolerances. The threads of the internally threaded carrier block, when worn, become larger with respect to the threads of the threaded lead screw. This looseness reduces the torquing pressure of the lead screw transferred to the carrier block. This leads to weaker nip roll pressures due to thread slippage and thus, the lack of positive pressure on the nip roll, and drive component collateral damage. At some point, the carrier block needs to be replaced, having the separable and improved carrier blocks of the present invention installed allows for quick maintenance and replacement to keep operation at peak efficiency.

As many changes are possible to the embodiments of this invention utilizing the teachings thereof, the descriptions above, and the accompanying drawing should be interpreted in the illustrative and not in the limited sense.

That which is claimed is:

1. A carrier block assembly driven by a horizontally disposed threaded lead screw and supporting a splicing head assembly with a load bearing shaft of a splicing machine, said carrier block assembly comprising a separable, mating two part body structure defining separate body half structures, each said body half structure having an inside surface with a plurality of alternating lands and grooves extending across said inside surfaces to form an interlocking lands and grooves arrangement in said carrier block assembly, said interlocking lands and grooves arrangement comprising individual mating lands and grooves having equal heights, widths and lengths, said carrier block assembly being a generally rectangular solid structure having a length, a height and a thickness, each said body structure half structure being separable at said carrier block thickness, said carrier block having a continuous threaded bore along said body length in a transverse direction with respect to said lands and grooves to provide a positive movement between said carrier block and the lead screw, and a non-threaded bore through said body thickness and normal to and spaced from said threaded bore, said non-threaded bore for receiving the load bearing shaft of a splicing head assembly, said carrier block further having a plurality of apertures in said body thickness, and a plurality of fasteners for extension through said plurality of apertures to thereby secure said separate body halves to form said carrier block, whereby the movement of the threaded lead screw within said continuous threaded bore of said carrier block assembly results in the forces of the splicer head assembly moving therewith being born by the interlocking lands and grooves.

2. The carrier block of claim 1, wherein said carrier block is composed of a rigid nylon composition.

3. The carrier block of claim 1, wherein said threaded bore has threads to receive and match the threads of a lead screw and wherein said carrier block directly engages said lead screw threads.

4. The carrier block of claim 1, wherein said apertures are countersunk and wherein said fasteners are accessible on one side of said carrier block.

5. The carrier block of claim 2, wherein said threads of said threaded bore are beveled.

6. The carrier block of claim 1, wherein said carrier block body is formed of a material selected from the group consisting of nylon, aluminum, bronze and metal.

7. The carrier block of claim 1, wherein said fasteners comprise shoulder bolts and cooperating propel nuts.

8. The carrier block of claim 1, wherein said carrier block comprises a right side carrier block and a left side carrier block.

9. A carrier block assembly for a threaded lead screw of a splicing machine having a load bearing shaft comprising:
   a) a carrier block body having a length, a height and a depth, said carrier block being constructed and arranged of separable mating block body halves comprising a first body half and a second body half, said mating body halves being separable, generally midway said depth of said carrier block body, each said first and second block body halves having inside faces;
   b) said inside faces of said first and second block halves having a plurality of cooperating mating lands and grooves extending across said inside faces and being constructed and arranged to form a unitary nested interlocking carrier block body;
   c) a generally threaded semi-circular bore formed into said inside faces of said first and second block halves in a direction transverse said plurality of mating lands and grooves, said threaded bore extending generally midway said depth of said nested carrier block body and extending along said length of said block body, said threaded bore being continuous and matching the threads of the threaded lead screw, whereby the turning of the threaded lead screw in said carrier block body produces a force normal said lands and grooves of said nested interlocking carrier block body;
   d) a second bore extending through said depth of said carrier block body and being generally normal to and spaced from said threaded bore, said second bore for receiving a load bearing shaft of a splicing machine;
   e) a plurality of third bores extending through said carrier block body, said plurality of third bores for securing said carrier block body into a unitary structure; and
   f) a plurality of fasteners for extension through said plurality of third bores to secure said first body half to said second body half, said fasteners having tightening and untightening means accessible on one side of said carrier block body.

10. The carrier block assembly of claim 9, wherein said third bores are countersunk and wherein said threads of said threaded bore are beveled.

11. The carrier block assembly of claim 9, wherein said carrier block body is formed of a material selected from the group consisting of nylon, aluminum, bronze and metal.

12. The carrier block assembly of claim 9, wherein said carrier block body has an outside face and wherein said plurality of fasteners comprise shoulder bolts and cooperating propel nuts accessible to said outside face.

13. The carrier block assembly of claim 9, wherein said carrier block body comprises a right side carrier block assembly or a left side carrier block assembly.

14. The carrier block of claim 8, wherein said right side and left side carrier blocks each have an outside face directed toward the outside of the splicer machine and wherein said fasteners are accessible on said outside faces.

15. The carrier block assembly of claim 1, wherein each said body half structure has at least five interlocking lands and grooves.

* * * * *